Sept. 18, 1928.  1,684,538
S. B. HASELTINE
FRICTION SHOCK ABSORBING MECHANISM
Filed April 23, 1925  2 Sheets-Sheet 1
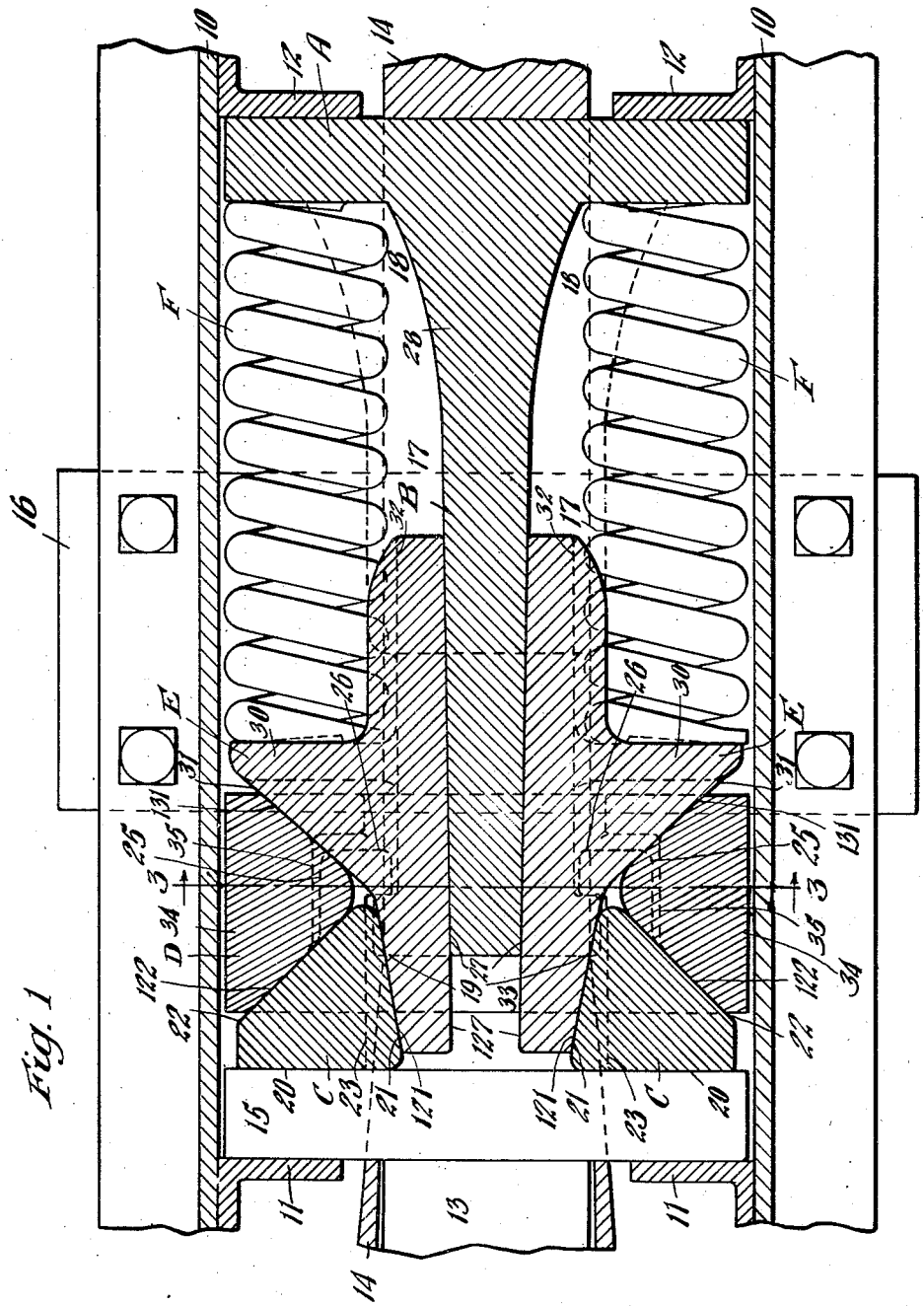
Witness  
Wm. Geiger
Inventor  
Stacy B. Haseltine  
By George I. Haight  
His Atty.

Sept. 18, 1928.
S. B. HASELTINE
1,684,538
FRICTION SHOCK ABSORBING MECHANISM
Filed April 23, 1925 — 2 Sheets-Sheet 2
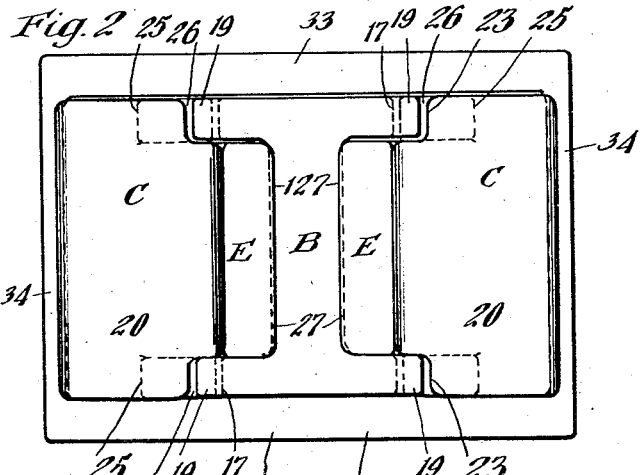
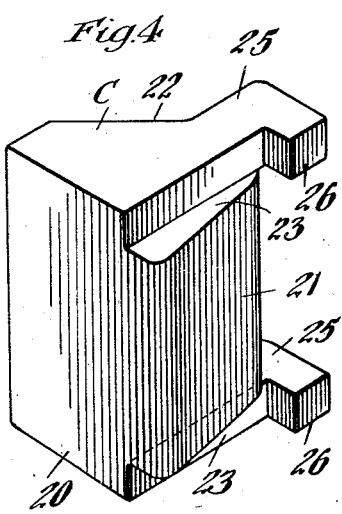
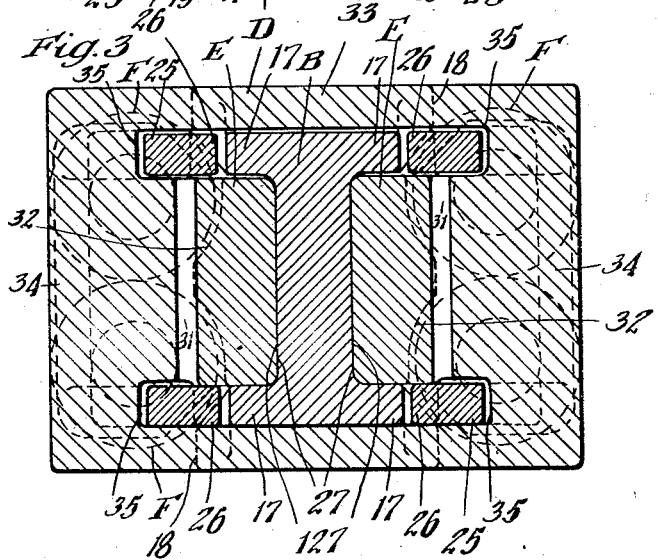
Witness
Wm. Geiger
Inventor
Stacy B. Haseltine
By George I. Haight
His Atty.

Patented Sept. 18, 1928.

1,684,538

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed April 23, 1925. Serial No. 25,237.

This invention relates to improvements in friction shock absorbing mechanisms.

One object of the invention is to provide a friction shock absorbing mechanism especially adapted for railway draft riggings, including a column member having longitudinally disposed friction surfaces, friction elements cooperating with the column element and lateral wedge pressure transmitting means, wherein is obtained high frictional capacity combined with assured release.

A more specific object of the invention is to provide a mechanism of the character indicated having great column strength, including a central friction post, a pair of friction shoes coacting therewith and wedge means coacting with the shoes, wherein the shoes are provided with both blunt and keen wedge faces.

Other objects and advantages of the invention will more fully and clearly appear from the description and claims hereinafter following.

In the drawings forming a part of this specification, Figure 1 is a longitudinal, horizontal, sectional view of a portion of a railway draft rigging, showing my improvements in connection therewith. Figure 2 is a front end, elevational view of the shock absorbing mechanism proper. Figure 3 is a vertical, transverse, sectional view corresponding substantially to the line 3—3 of Figure 1. And Figure 4 is a detailed, perspective view of a wedge block used in connection with my improved mechanism.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13, to which is operatively connected a hooded yoke 14 of usual form.

The shock absorbing mechanism proper, as well as a front main follower 15, is disposed within the yoke. The yoke and the parts therewithin are supported in operative relation by a detachable saddle plate 16 supported from the draft sills.

The improved shock absorbing mechanism proper, as shown, comprises, broadly, a rear follower element A; a friction post B; two wedge blocks C—C; a wedge casing D; two friction shoes E—E; and two sets of twin spring resistance elements F—F.

The rear follower A is of generally rectangular form and has the friction post B forwardly projecting therefrom, the post B being preferably formed integral with the follower A. The follower A cooperates with the stop lugs 12 in the usual manner. As most clearly shown in Figures 2 and 3, the post B is of I-beam cross-section, being provided with oppositely extending top and bottom, longitudinally disposed flanges 17—17, the flanges 17 at their rear ends terminating in top and bottom webs 18—18 formed integral with the rear follower. It will be seen that a post of unusual column strength is thus provided, the flanges 17 at the top and bottom of the same forming reinforcing means. At the front end of the post, the flanges 17 are laterally extended, as indicated at 19—19, thereby providing stop lugs which coact with the wedge blocks C as hereinafter more fully described. The friction post proper is provided with longitudinally disposed friction surfaces 27—27 on the opposite sides thereof, the surfaces 27, as shown, diverging rearwardly of the mechanism. The friction surfaces 27 extend for the greater length of the post and the rear end of the post beyond the friction surfaces is thickened, as indicated at 28.

Wedge members C are two in number and are disposed at opposite sides of the mechanism. Each of the wedges C is in the form of a heavy cast block having a transverse flat front end face 20 adapted to cooperate with the inner surface of the main follower 15. On the inner side, each block C is provided with a wedge face 21 extending at a relatively keen angle with reference to the longitudinal axis of the mechanism. As most clearly shown in Figure 1, the wedge faces 21 of the opposed wedge blocks C diverge rearwardly of the mechanism. Each wedge block has a second wedge face 22 on the outer side thereof, the latter face being disposed at a blunter angle with reference to the longitudinal axis of the mechanism than the face 21. On the inner side, each wedge block C is cut away at opposite sides, as indicated at 23, to provide clearance for the lugs 19 of the friction post B. Each block C is also provided with a pair of rearwardly extending arms 25—25 at the top and bottom thereof, each of the arms having a laterally inwardly extending lug 26 at the rear end thereof, the lugs 26 of the two arms being adapted to cooperate with the top and bottom lugs 19 of the flanges 17 at the corresponding side of the post B. It will be evident that the lugs 26, when engaging the lugs 19, limit the outward movement of the wedge blocks and determine the overall length of the gear.

The friction wedge shoes E are each of like construction being in the form of relatively heavy castings. As most clearly shown in Figures 1 and 3, the shoes C are disposed on opposite sides of the friction post, being embraced between the top and bottom flanges 17 of the latter. Each of the shoes E has a relatively long, longitudinally disposed, friction surface 127 on the inner side thereof adapted to cooperate with the friction surface 27 at the corresponding side of the post. On the outer side, each shoe has a lateral enlargement 30 between the front and rear ends thereof. Forwardly of the enlargement 30 each shoe has an outer wedge face 121 correspondingly inclined to and adapted to cooperate with the wedge faces 21 of the corresponding wedge C. At the forward side of the enlargement 30 a wedge face 31 is provided, disposed at a relatively blunt angle to the longitudinal axis of the mechanism. The rear end of the enlargement 30 presents a substantially flat face forming an abutment for the front ends of the set of springs F at the corresponding side of the mechanism, the portion of the shoe rearwardly projecting beyond the enlargement 30 being recessed at the top and bottom, as indicated at 32, to accommodate the sides of the two coils of the spring resistance elements F.

The wedge casing D is in the form of a heavy rectangular casting having horizontal disposed top and bottom walls 33—33 and vertically disposed, relatively thick side walls 34—34. The casing D, as shown, is open at the front and rear ends. At the forward end, each side wall 34 has an inner wedge face 122 correspondingly inclined to and adapted to cooperate with the wedge face 22 of the wedge block C at the same side of the mechanism. Each side wall 34 also has an inner wedge face 131 at the rear end thereof correspondingly inclined to and adapted to cooperate with the wedge face 31 of the corresponding friction shoe E. Each side of the casing A is interiorly recessed at the top and bottom, as indicated at 35, to freely accommodate the arms 25 of the wedge blocks C.

The springs F are four in number, being arranged in vertically alined pairs at opposite sides of the friction post and have their opposite ends bearing respectively on the rear follower A and the enlargements 30 of the friction shoes E. Each of the spring members F comprises a relatively heavy coil, as most clearly shown in Figure 1. It will be evident that by arranging the springs in vertically disposed sets at opposite sides of the post, a post of maximum width may be employed without sacrificing the spring capacity of the mechanism, inasmuch, as the two relatively heavy small coils occupy a smaller space at each side of the post than it would require to accommodate a single large diameter coil of equal capacity.

The normal full released position of the mechanism is that shown in Figure 1, wherein the wedge blocks C are held in their outermost position by engagement with the lugs of the friction post and the friction shoes are in wedging engagement with the wedge casing which in turn is in wedging engagement with the wedges C, the friction shoes being held in their outermost position by the main springs F which are under initial compression.

The operation of my improved shock absorbing mechanism, assuming a compression stroke, is as follows: As the front follower 15 is forced inwardly of the mechanism, a wedging action will be set up between the coacting wedge faces of the wedge blocks, wedge casing and shoes. Due to the inwardly directed pressure on the wedge casing D, a wedging action will also be set up between the wedge faces 131 and 31 of the casing and shoes E. As the follower and wedge blocks C are carried inwardly of the mechanism, the wedge casing D and the friction shoes E will be carried inwardly therewith, the friction shoes sliding on the friction surfaces of the post B. Due to the diverging relation of the friction surfaces of the post, there will be a lateral spreading apart of the friction shoes, thereby effecting an additional rearward movement of the shoes E, the latter having slight slippage on the faces 21 and 131 of the wedge blocks and casing, respectively. Due to the action just described, there will also be a slight lateral slippage of the wedge blocks C on the inner surfaces of the follower 15 and on the wedge faces 122 of the wedge casing. The described action will continue either until the actuating force is reduced or until the outer end of the friction post is engaged by the follower 15, whereupon the compression of the springs F will be limited and the actuating force transmitted directly through the post B and the rear follower A to the stop lugs 12. When the actuating pressure is reduced, the springs F will act to restore all of the parts to normal position.

As wear occurs on the different wedge and friction faces, compensation therefor is had by the shoes E and the casing D moving forwardly, the main springs being placed under initial compression when the parts are assembled to assure this movement. The overall length of the mechanism is maintained by the lugs 26 of the wedge blocks which engage the lugs 19 of the post B.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a central friction post of I-beam cross-section, said post having opposed longitudinal extending friction surfaces; a plurality of wedge blocks having transverse outer end faces; a pressure transmitting member directly engaging said outer end faces of the wedge blocks; friction shoes cooperating with the wedge blocks and friction post; a lateral pressure resisting means having interior wedge faces cooperating with the wedge blocks and shoes; and spring resistance means opposing inward movement of the shoes.

2. In a friction shock absorbing mechanism, the combination with a main follower; a friction post on said main follower, said post having reinforcing flanges at the top and bottom thereof and longitudinally disposed, rearwardly diverging, friction surfaces on the opposite sides thereof; a pair of friction shoes cooperating with the friction surfaces of the post; spring resistance elements interposed between the friction shoes and said follower element; a wedge casing having wedge faces cooperating with wedge faces on the friction shoes; wedge blocks having wedge faces cooperating respectively with wedge faces on the casing and additional wedge faces on the friction shoes; and a second main follower cooperating with the wedge blocks.

3. In a friction shock absorbing mechanism, the combination with a front follower having a flat transverse friction surface; of a rear follower having a friction post forwardly extending therefrom, said post having longitudinally disposed friction surfaces on the opposite sides thereof; a pair of friction shoes disposed at opposite sides of the post and cooperating with the friction surfaces thereof, each shoe being provided with a blunt wedge face and a relatively keen wedge face; a wedge casing having a pair of blunt wedge faces at each side thereof, one face of said pair co-operating with the blunt wedge face of the corresponding wedge shoe; and a wedge block interposed between the keen wedge face of each shoe and the remaining blunt wedge face of the casing at the same side of the mechanism, each wedge block also having a flat friction face cooperating with the friction surface of the front follower; and main spring resistance elements opposing inward movement of the friction shoes.

4. In a friction shock absorbing mechanism, the combination with a central friction post having laterally extending lugs at the forward end thereof, said post also having longitudinally disposed friction surfaces; a pair of friction shoes cooperating with the friction surfaces of the post; a pair of wedge blocks cooperating with the friction shoes, said blocks having lugs cooperating with the lugs of the post to limit outward movement of the shoes and maintain the overall length of the gear; a main follower cooperating with the wedge blocks; and main springs resisting inward movement of the friction shoes.

5. In a friction shock absorbing mechanism, the combination with front and rear relatively movable main followers; stop lugs cooperating with said followers; a yoke within which said followers are disposed; a friction post on one of said main followers, said post having reinforcing means at the top and bottom, extending longitudinally thereof and longitudinally disposed friction surfaces on its opposite sides; a pair of friction shoes cooperating with the friction surfaces of the post; spring resistance elements interposed between the friction shoes and the follower carrying the post; a wedge casing having wedge faces cooperating with wedge faces on the friction shoes; and wedge blocks having wedge faces cooperating respectively with the wedge faces on the casing and additional wedge faces on the friction shoes.

In witness that I claim the foregoing I have hereunto subscribed my name this 21st day of April 1925.

STACY B. HASELTINE.